July 6, 1926.
W. L. McGRATH
1,591,394
CALIPERS
Filed March 3, 1923
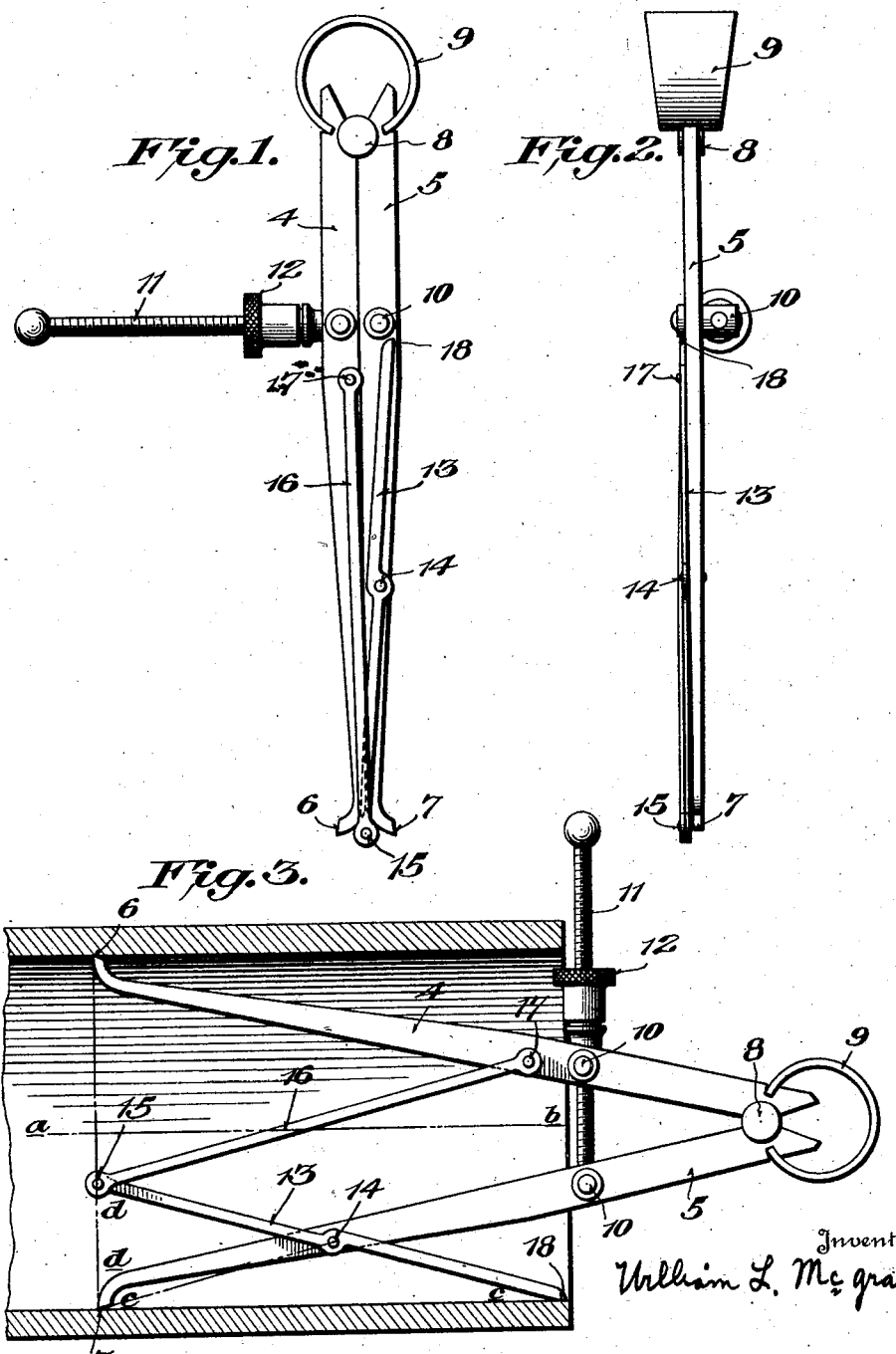

Patented July 6, 1926.

1,591,394

UNITED STATES PATENT OFFICE.

WILLIAM L. McGRATH, OF ELMIRA, NEW YORK, ASSIGNOR TO ECLIPSE MACHINE COMPANY, OF ELMIRA, NEW YORK, A CORPORATION OF NEW YORK.

CALIPERS.

Application filed March 3, 1923. Serial No. 622,578.

This invention relates to geometrical instruments for measuring distance, and particularly to improvements in calipers of the type commonly employed for taking "inside" measurements.

Inside calipers of the type ordinarily used heretofore must be handled by skilled workmen with extreme care when a high degree of accuracy is desired. This results from the fact that such calipers must be placed in contact with the surface, or surfaces, of the object having dimensions that are to be measured, in such a manner that the imaginary line joining the two ends, or measuring points, of the caliper legs occupies the same position relative to said surface at every reading. If a reading be taken when this line does not occupy said relative position, that is, if the calipers are canted, or inclined, the result will be inaccurate.

One of the objects of this invention is to provide a pair of calipers, of simple and rugged construction, which may be used by an unskilled workman to quickly obtain accurate measurements of the kind indicated. Stated broadly, the invention comprises a pair of calipers provided with means to assist an operative, at each reading, in placing the measuring points of said calipers in the same position relative to the surface of the object that has the dimension to be measured.

The invention will be readily understood by reference to the accompanying drawings, illustrating one embodiment of the inventive idea, wherein—

Fig. 1 is a side elevation of a pair of calipers embodying the present invention;

Fig. 2 is a view taken at right angles to Fig. 1; and

Fig. 3 is a view illustrating my improved calipers placed in contact with a surface to be measured.

Referring to the drawings, wherein like reference numerals refer to like parts throughout the several views, 4 and 5 are legs of an inside spring caliper having formed, in any suitable manner at the lower ends thereof, the measuring points 6 and 7, said legs being adapted to pivot about a double-headed pivot pin 8. The usual curved leaf spring 9, swivel heads 10, adjusting screw 11, and knurled nut 12, maintain legs 4 and 5 in the proper position relative to pin 8, enable the operative to adjust points 6 and 7 to the proper distance, and normally maintain said points in the position to which they are set, as is well known.

When measuring the distance apart of two points on a surface, or on two surfaces, it is desirable that points 6 and 7 be placed in contact with said surface or surfaces, in such a manner that the imaginary line joining said points be substantially normal to the surface at the points of contact. My improved calipers are, accordingly, provided with means pivotally secured to legs 4 and 5 for facilitating the proper positioning of points 6 and 7.

In the form shown, a cross-lever 13 is preferably pivoted at its center 14 to leg 5 at a point distant from measuring point 7 equal to the length of one arm of said lever, the point 14 being so located relative to leg 5 that it lies on a straight line connecting point 7 and the center of pin 8. The inner end of lever 13 is pivoted, in any suitable manner, as at 15, to one end of a link 16, the opposite end of said link being pivoted to leg 4 at a point 17 which is located at a distance from the center of pin 8 equal to the length of one of the arms of lever 13, and on a straight line joining point 6 and the center of pin 8. Points 14 and 15 are positioned, one with the other, in such a manner that a straight line joining these two points, if extended, will pass through the point 18 at the outer end of cross-lever 13. It will now be seen that the distance 14—15 equals the distance 8—17, while length 15—17 equals 8—14, and if lines be drawn through the four points 8, 14, 15 and 17, a parallelogram will be formed. Also, since the distances 6—8 and 7—8 are equal, and since the distance 7—14 equals the distance 17—8, the distance from point 17 to measuring point 6 equals the distance 15—17.

When measuring the distance between two points on a surface with my improved caliper, as for example when measuring the inside diameter of a cylinder as illustrated in Fig. 3, an accurate reading may be quickly obtained by placing point 7 and point 18, at the outer end of cross-lever 13, in contact with the inner surface of said cylinder. Regardless of the distance apart that points 6 and 7 have been adjusted or moved, the imaginary line joining these points will now lie in a plane situated at right angles to the longitudinal axis $a$—$b$ of the cylinder being measured. This results from the fact that the sum of the angles of the imaginary triangle 15, 18, 7 equals 180°; this triangle, however, comprises two isosceles triangles 15, 14, 7 and 7, 14, 18 having the common side illustrated by the dotted line 7, 14; and the base angles $d, d$ and $c, c$ of said isosceles triangles form the angles of the large triangle 15, 18, 7. This relation may be expressed as follows:

$$2\angle c + 2\angle d = 180°$$

Therefore, $$\angle c + \angle d = 90°$$

It is now evident that angle $d$ plus angle $c$ will always equal 90°, and, since 6—17—15 is an isosceles triangle, it may be shown that points 6—15 and 7 will always lie on the same straight line, which line is always normal to the longitudinal axis $a$—$b$ of the cylinder.

I have thus provided an improved caliper embodying means for assisting an unskilled workman in placing the measuring points of the same in the proper measuring position. This greatly increases the speed and accuracy with which readings may be obtained.

While one form of the invention has been described and illustrated in the accompanying drawings with considerable particularity, it is to be expressly understood that the drawings are for purposes of illustration only and are not designed as a definition of the limits of the invention, reference being had to the appended claims for this purpose.

What is claimed is:—

1. A device of the class described comprising a pair of legs, means pivotally connecting said legs, a lever pivotally connected intermediate its ends to one of said legs, and a link pivoted to said lever and the other of said legs whereby the free end of the lever and the measuring end of the adjacent caliper legs are maintained in a line at right angles to a line through the measuring points of said legs regardless of the distance apart that the latter are adjusted.

2. A device of the class described comprising a pair of legs, a lever pivotally connected to one of said legs, and means for maintaining one end of said lever and the measuring end of the caliper leg to which the lever is pivoted in a line at right angles to the line passing through the measuring points of said legs regardless of the distance apart that the latter are adjusted.

3. A device of the class described comprising a pair of legs, means including a spring for pivotally connecting said legs, a lever pivotally connected to one of said legs, and means for maintaining one end of said lever and the measuring end of the caliper leg to which the lever is pivoted in a line at right angles to the line passing through the measuring points of said legs regardless of the adjustment of the latter.

4. The combination of a caliper having pivoted legs and a support therefor, said support comprising a measuring point on one of the caliper legs, a lever pivotally mounted intermediate its ends on said leg, a link connecting said lever to the other of said caliper legs, said lever and link being of such length and so pivoted to said legs and to each other that a line passing through the free end of said lever and the adjacent measuring point is substantially at right angles to a line passing through the measuring points of the caliper regardless of the distance apart to which said points are adjusted.

5. A device of the class described comprising a pair of legs, means pivotally connecting said legs, a lever pivoted intermediate its ends to one of said legs, a link equal in length to said lever pivoted to the other of said legs and to one end of the lever, and means for adjusting said legs.

6. The combination of an inside caliper and means attached thereto for preventing canting of the caliper measuring points when engaged with an object to be measured, said means comprising a cross-lever disposed substantially in the plane of the caliper legs and pivotally mounted intermediate its ends on one of the same, the measuring points of said leg and one end of said lever being adapted to support the caliper on the interior of the object being measured, and a link connection for said lever with the other caliper leg, said lever and link being of equal length.

7. In a device of the class described, the combination of a pair of adjustable caliper legs, a lever pivoted to one of said legs, a link pivoted at one end to said lever and at its opposite end to the other of said legs, and resilient means engaging each of said legs, said lever and link being so pivoted and of such length that the free end of said lever and the adjacent measuring point are maintained in a line located substantially at right angles to a line passing through the measuring points of said legs.

In testimony whereof I have signed this specification.

WILLIAM L. McGRATH.